United States Patent [19]
Hekimian

[11] 3,916,307
[45] Oct. 28, 1975

[54] TIME JITTER METER

[75] Inventor: Norris C. Hekimian, Rockville, Md.

[73] Assignee: Hekimian Laboratories, Inc., Rockville, Md.

[22] Filed: Feb. 14, 1974

[21] Appl. No.: 442,340

[52] U.S. Cl.................. 324/83 R; 328/155; 331/25
[51] Int. Cl.² ...................... G01R 25/00; H03B 3/04
[58] Field of Search............. 324/83 R, 83 A, 83 D; 328/155; 331/25

[56] References Cited
UNITED STATES PATENTS 3,711,773  1/1973  Hekimian .......................... 324/83 R Primary Examiner—Alfred E. Smith
Assistant Examiner—Rolf Hille
Attorney, Agent, or Firm—Rose & Edell

[57] ABSTRACT

A time jitter meter is capable of receiving pulse trains at a variety of repetition rates and measuring pulse transition time jitter with a variety of resolution capabilities. The pulse train and its associated jitter are translated to a first standard intermediate frequency which is passed through a narrowband IF filter. The filtered signal is passed through a zero-crossing limiter and then frequency-divided by a selected divider to determine measurement resolution. The frequency-divided signal is then translated to a second standard intermediate frequency which is applied to a phase lock loop in which it is compared against the phase of a VCO. Phase excursions detected in the loop are measured on an RMS meter and a phase hit counter. The loop employs a unique integrator which permits rapid phase lock followed by smooth tracking of the input signal. The integrator is operated as an amplifier prior to phase lock, the integrating capacitor being permitted to charge to the amplifier output level while remaining outside the loop. When phase lock occurs the charged capacitor is switched into the loop at the proper charge level. The loop thus changes smoothly from a wide band first order loop before phase lock to a narrowband second order loop after phase lock.

15 Claims, 2 Drawing Figures

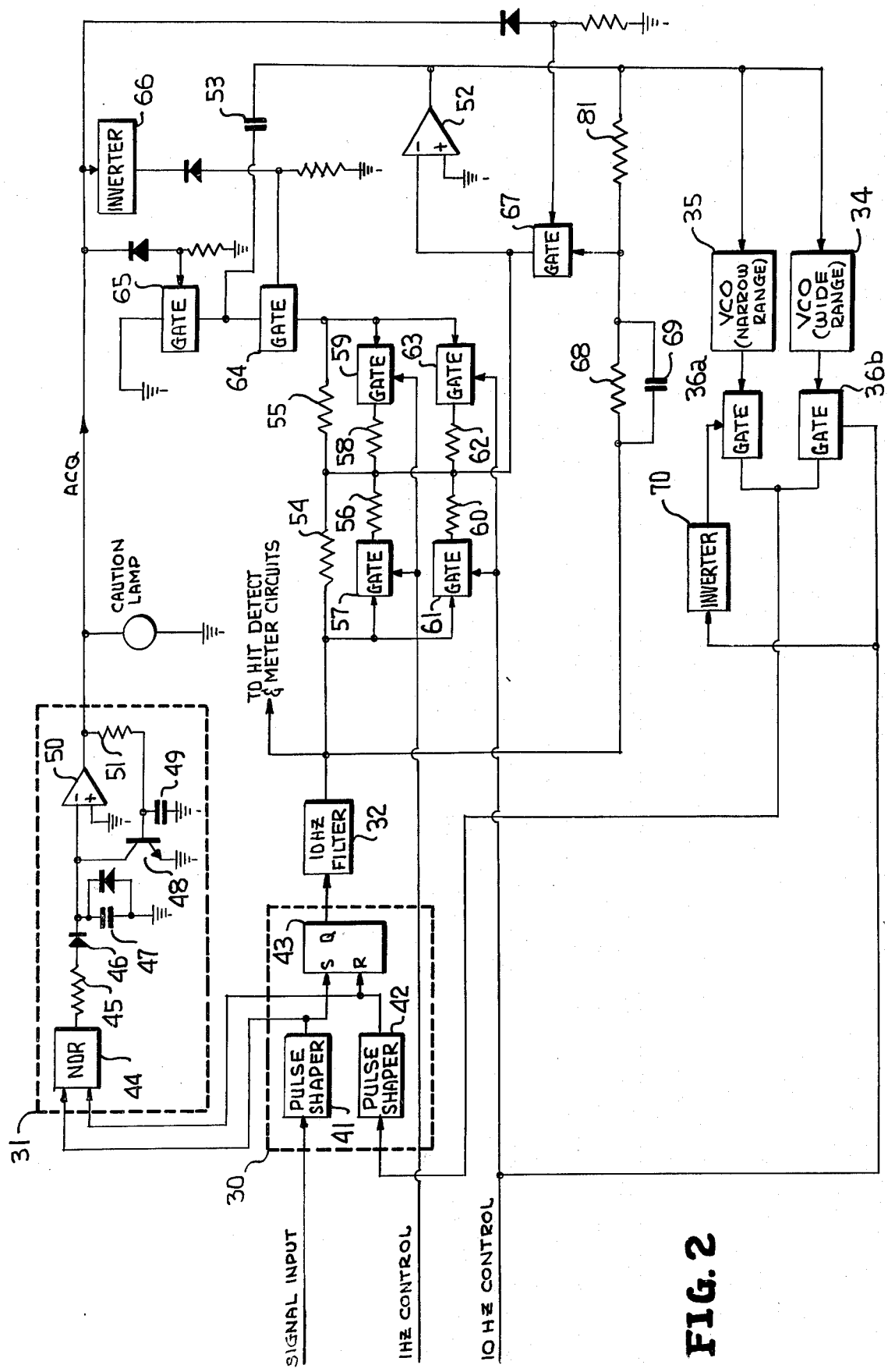

TIME JITTER METER

BACKGROUND OF THE INVENTION

The present invention relates in part to the measurement of time jitter in pulse trains and, more particularly, to a method and apparatus for measuring time jitter over a large jitter range and at selected resolution in pulse trains of different repetition rates. In addition the present invention relates to an improvement in phase lock and other types of loops whereby phase lock may be achieved rapidly and maintained reliably.

Transition time jitter in pulse trains, such as PCM signals, is a major cause of digital communications system performance problems. Time jitter, which is equivalent to phase jitter in sinusoidal signals, may result from timing uncertainties in digital equipment, changing characteristics of the transmission medium, and/or equipment malfunction, and can range from a small fraction of a bit width to many bit widths. Transmission media such as microwave links often introduce short term timing disturbances or "hits" which seriously impair system operation. The effects of time jitter and time hits on system performance makes it necessary to measure these parameters and isolate their sources.

It is conventional in the art of phase jitter and phase hit measurement to compare the phase of measurement signal with that of a VCO reference signal in a phase lock loop. RMS time jitter and time hits (i.e. — individual time jitter excursions in excess of a pre-established threshold) signals are derived from the loop. Such systems have a number of practical disadvantages. One such disadvantage relates to the fact that a single, simple loop can measure time jitter for only one repetition rate of the measurement signal. Since various clock rates are employed in data transmission systems, a jitter meter capable of measurement at only one such rate has only limited application. It is possible, of course, to employ multiple phase lock loops, one for each measurement signal repetition rate. But this becomes expensive on the one hand and creates a severe calibration problem on the other hand, since each loop must be precisely calibrated to each of the others in order that measurements by the one loop shall have meaning with respect to measurements by the others.

Another advantage with prior art time jitter meters relates to the inability to measure jitter greater than about 1 bit peak-to-peak.

It is therefore an object of the present invention to provide a method and apparatus for measuring time jitter and time hits wherein a wide variety of measurement signal repetition rates may be employed and measurement resolution may be adjusted, both without sacrificing measurement accuracy.

Another problem associated with prior art time/phase jitter meters specifically and phase lock loops in general relates to the contradictory requirements for the loop in the acquisition and lock modes. In acquisition it is desirable that the loop bandwidth be wide in order that acquisition by the loop be accomplished in the shortest possible time. On the other hand, once phase lock has occurred it is desirable to have a narrowband loop in order that the loop may track only the mean phase of the signal accurately and have minimal sensitivity to high frequency jitter and noise. If, as in most phase lock loops, the narrowband required during phase lock is employed to scan the operating frequency range during acquisition (i.e — before lock), the acquisition time becomes unacceptably long because acquisition time is inversely proportional to loop bandwidth. In order to accommodate these contradictory requirements, most phase lock loops in the prior art employ a loop bandwidth which is a compromise between the two requirements and thereby never optimizes operation in either of the two loop modes. Other techniques, such as pretuning or charge-pumping the loop VCO, result in faster acquisition times but require more complex and expensive circuitry.

It is another object of the present invention to provide a novel circuit which permits optimum operation of a loop in both its acquisition and lock modes, and which does so with a minimum of expense and complexity.

SUMMARY OF THE INVENTION

In accordance with one aspect of the present invention, the input pulse train having one of multiple permissible repetition rates, is frequency translated along with its associated jitter to a standard frequency so that only one phase lock loop is required irrespective of the input signal repetition rate. Frequency translation is accomplished in two steps so that the signal frequency can be divided by a selectable factor after the first translation. This selectable frequency division effectively changes the time jitter measurement resolution in proportion to the division factor.

In accordance with another aspect of the present invention the phase lock loop of the time jitter meter employs an integrator circuit which is switched into a non-integrating amplifier configuration during the acquisition mode of the loop. In addition, the integrator capacitor, although not in the loop during acquisition, is charged to the amplifier output level so that it may be switched, with minimal transient effect, into the circuit upon phase lock. The resulting wide band operation of the first order loop during the acquisition mode permits rapid acquisition and setting of the initial conditions of the integrator. The pre-charged capacitor permits a smooth transition into the phase lock mode wherein the integrator is operative to effect second order narrow-band loop operation.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein:

FIG. 2 is a partially block-partially schematic diagram of the phase lock loop employed in the jitter meter of FIG. 1 and illustrating in particular detail the switched integrator/amplifier circuit of the present invention.

DESCRIPTION OF PREFERRED EMBODIMENTS

Figure 1:
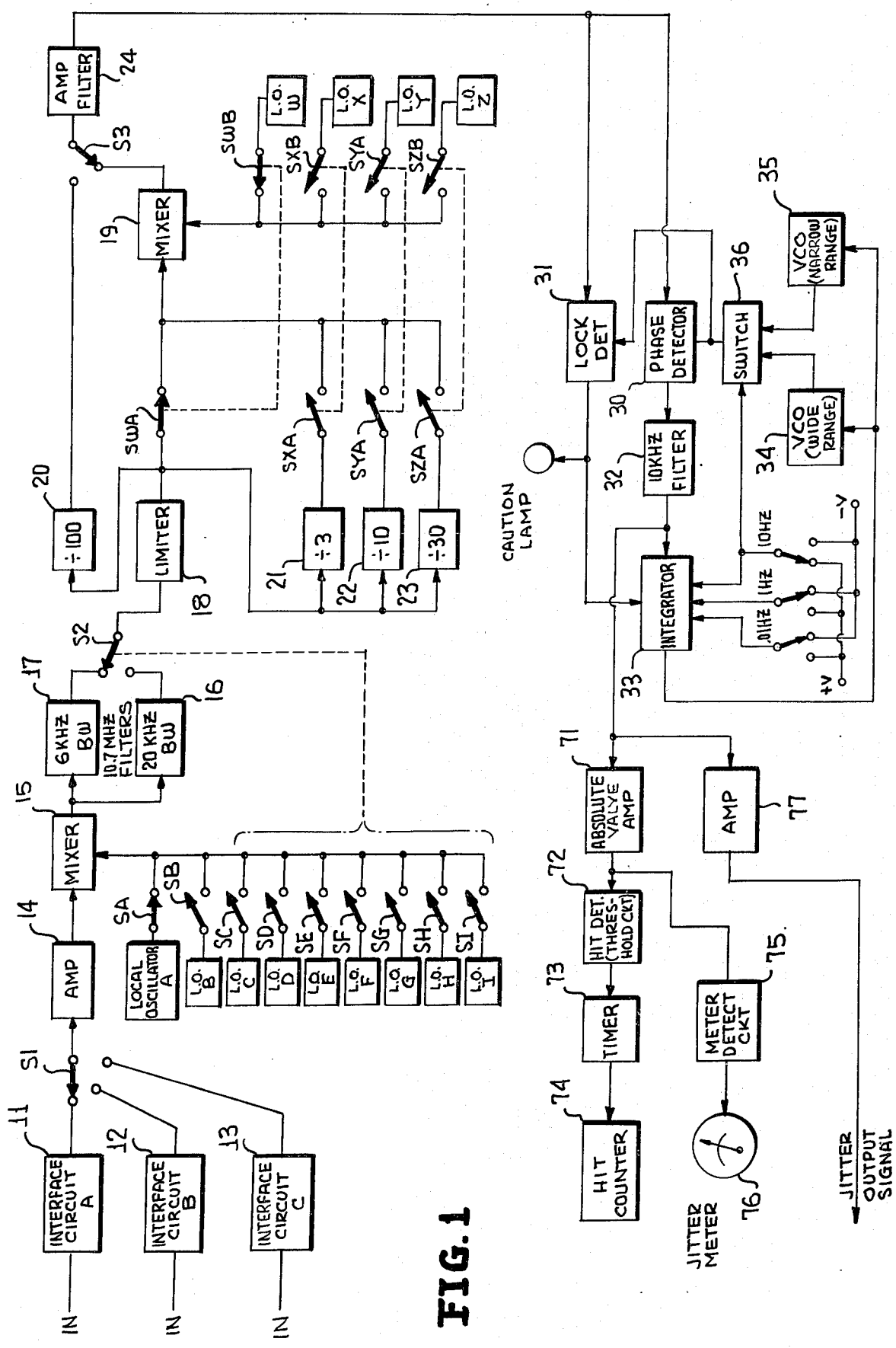
FIG. 1 is a functional block diagram of a time jitter meter according to the present invention.

Referring to FIG. 1 of the accompanying drawings, measurement pulse train signals at one of multiple permissible repetition rates are applied to any one of three interface circuits 11, 12 or 13. For example, interface circuit 11 may be adapted to receive an NRZ 100 ohm balanced input; interface circuit 12 may be adapted to receive a bipolar 100 ohm balanced input; and interface circuit 13 may be adapted to receive a bipolar 75 ohm unbalanced input. The interface units perform impedance matching and pulse shaping functions for the input pulse trains in a conventional manner. The output signal from the selected interface circuit is passed through selector switch S1 to a preconditioner input amplifier 14 and then to mixer 15.

The function of mixer 15 is to translate the frequency of the input signal to a first intermediate frequency (IF), for example 10.7 MHz. To effect this translation, mixer 15 also receives a signal from one of local oscillators (L.O.) A through I as selected by the actuated one of switches SA through SI. These switches are interlocked so that only one at a time can be actuated. The switches would typically be located on the front panel of the unit so that the proper L.O. can be selected for the particular input signal repetition rate, whereby the output signal from mixer 15 is at the first intermediate frequency. More particularly, L.O.'s A through I have frequencies which when either summed with or subtracted from a respective input frequency yield the first intermediate frequency.

The output signal from mixer 15 is passed to two narrow bandwidth filters 16 and 17 in parallel. These filters each have a center frequency corresponding to the first IF (i.e. 10.7 MHz); filter 16 has a 20 KHz passband whereas filter 17 has a 6 KHz passband. Only one of these filters at a time is selected to pass signal, the selection being effected by switch S2 which alternatively connects the filters to limiter 18. Switch S2 is linked to the input repetition rate selection switches so that it selects the 6 KHz bandwidth for input signals having low repetition rates. The 6 KHz filter 17 is provided because the L.O. frequencies for the input signals of low repetition rate would fall within the 20 KHz bandwidth of filter 16.

The signal applied to limiter 18 is at the first I.F. (10.7 MHz) and carries the time jitter which is associated with the input pulse train. The narrowband characteristic of filter 16 or 17 removes the local oscillator and image frequencies so that the filter output signal is substantially sinusoidal. Limiter 18, which receives this signal, is a zero crossing input limiter provided for the purpose of driving the second mixer 19 and frequency dividers 20, 21, 22, and 23. These frequency dividers are all fed in parallel by the limiter and their output signals are alternatively selected by jitter range switches SWA, SXA, SYA, SZA and S3. Those switches are interlocked so that only one is actuated at a time. When switch SWA is actuated the output signal from limiter 18 is passed directly to mixer 19. Switches SXA, SYA and SZA, on the other hand, connect the output signals from dividers 21, 22, and 23 to mixer 19. Switch S3 connects either the output signal from mixer 19 or the signal from divider 20 to an amplifier filter circuit 24. Thus by means of these switches the output signal from limiter 18 can be frequency divided by a factor of 3 (SXA), 10 (SYA), 30 (SZA), 100 (S3) or 1 (SWA). If divided by 100 the signal is at the second intermediate frequency, or 107 KHz, in the example chosen for the illustrated embodiment. This 107 KHz signal is applied to tuned amplifier circuit 24 which is tuned to 107 KHz.

If division factors of 1, 3, 10 or 30 are selected, the limiter output signal must be translated down to the second IF (107 KHz). This is done by means of local oscillators (L.O.'s) W through Z, in conjunction with selector switches SWB through SZB, at mixer 19. Switches SWB through SZB are ganged to switches SWA through SZA and automatically select the L.O. of the appropriate frequency to translate the limiter output signal down to the second IF. The mixer output signal is then amplified and filtered at tuned amplifier 24 to provide the 107 KHz signal bearing a component of the input signal time jitter as modified by the selected frequency division factor. The function of the selectable frequency division ratio is to scale the jitter now appearing on the limiter output signal (which is the same as the jitter on the system input signal) as necessary for convenient measurement on the jitter meter to be described subsequently. The effect is to have an adjustable measurement resolution capability.

As described above, regardless of the input signal repetition rate or the selected frequency division factor, the output signal from tuned amplifier 24 is at the second intermediate frequency. This signal is processed by a phase lock loop to provide the necessary jitter measurements. The phase lock loop includes a phase detector 30, a lock detector 31, a 10 KHz low pass filter 32, a loop integrator 33, voltage controlled oscillators (VCO's) 34, 35 and switching means to select loop bandwidth and the proper VCO. The loop is illustrated in greater detail in FIG. 2 to which reference is now made.

The phase detector 30 includes two pulse shapers 41, 42 and a set/reset flip-flop 43. Pulse shaper 41 receives the second IF signal from tuned amplifier 24 and provides a squared narrow pulse for every positive-going transition of that signal. Shaper 42 performs the same function for whichever of the VCO signals is being utilized in the loop. The narrow output pulses from pulse shapers 41 and 42 drive the set and reset input terminals, respectively, of flip-flop 43.

Each positive transition of the measurement signal from amplifier 24 results in flip-flop 43 being set; each positive transition of the VCO signal resets the flip-flop. Since the frequency of the VCO tracks the frequency of the measurement signal, the output signal from flip-flop 43 during phase lock is a square wave at the second IF (107 KHz) and having a duty cycle proportional to the phase difference between the VCO and measurement signals. The VCO phase is controlled by the average phase of the measurement signal. For the present loop, zero phase error is defined as a 180° phase difference between the measurement and VCO signals, so that at zero phase error the square wave signal from flip-flop 43 has a 50 percent duty cycle. Phase jitter has the effect of modulating the square wave duty cycle about 50 percent.

The square wave output signal from flip-flop 43 is applied to the 10 KHz filter 32 which functions to define the upper cut-off frequency of the measurement bandwidth of the loop and to average the phase detector output voltage. More specifically, since the 10 KHz filter cannot pass the 107 KHz square wave, it responds to duty cycle modulation in the square wave at frequencies below 10 KHz. The filter output signal amplitude is thus proportional to phase jitter in the form of duty cycle modulation of the phase detector square wave.

Lock detector 31 functions to place the loop in the acquisition mode when the VCO is not phase locked to the measurement signal. In this regard the lock detector provides the ACQ signal when there is no phase lock, the ACQ signal serving as a mode control signal for integrator 33. A two-input NOR gate 44 in the lock detector receives the squared pulses from pulse shapers 41 and 42. During phase lock and a negligible jitter condition, the input pulses to the NOR gate are 180° out of phase so that the NOR gate output signal is binary zero. Jitter on the measurement signal displaces the output pulses from shaper 41 relative to those from shaper 42 and a binary one output signal is provided by NOR gate 44 whenever both pulse shaper output signals are low. The one level output signal from the NOR gate is averaged in an averaging circuit comprising resistor 45, diode 46 and capacitor 47. When the average jitter is sufficiently high, the average level stored in capacitor 47 exceeds a predetermined threshold at amplifier 50 which provides an ACQ signal indicative of the acquisition mode. If the ACQ signal is present for a predetermined time determined by resistor 51 and capacitor 49 (e.g. 0.3 seconds), transistor 48 is switched to its conducting state and resets the level averaging capacitor 47. The ACQ signal also energizes the CAUTION lamp to indicate to the operator that there is no phase lock.

The loop integrator receives the jitter-proportional error signal from the 10 KHz filter 32 and further averages the error signal so that the VCO cannot "track out" or immediately follow the phase jitter to be measured. The integator includes operational amplifier 52, feedback integrating capacitor 53, a switchable resistive input circuit for the amplifier, and a switching circuit for selectively removing capacitor 53 from its feedback relationship about amplifier 52. The integrator time constant is in part determined by the resistive input circuit for amplifier 52, and the resistance of that circuit is switchable under the control of the operator. In this manner, the low cut off frequency of the loop is controlled.

More specifically, the integrator input signal, derived from filter 32, is applied to the inverting input terminal of amplifier 52 through resistor 54. A first series circuit including resistor 56 and gate 57 is connected across resistor 54 as is a second series circuit including resistor 60 and gate 61. The negative feedback circuit around amplifier 52 includes capacitor 53 in series with the source-drain circuit of gate 64 and a resistive network analogous to that in the amplifier input circuit. The feedback resistive network includes resistor 55 in parallel with a first series combination of resistor 58 and gate 59 and a second series combination of resistor 62 and gate 63. Gates 57 and 59 are actuated by an operator-controlled switch which provides the 1 Hz control signal. Gates 61 and 63 are actuated by an operator-controlled switch which provides the 10 Hz control signal. With neither of these signals present, only resistors 54 and 55 are in the circuit and low frequency cut-off for the loop is 0.1 Hz. If the 1 Hz control signal is present gates 57 and 59 are actuated to place resistors 56 and 58 in parallel with resistors 54 and 55, respectively; the resulting low frequency loop cut-off is then 1 Hz. In a similar manner the 10 Hz control signal places resistors 60 and 61 in the circuit to provide a low frequency cut-off of 10 Hz.

During acquisition, the junction between feedback capacitor 53 and the source-drain circuit of gate 64 is resistively coupled to ground through gate 65. In the acquisition mode (i.e — no phase lock), the ACQ signal renders gate 65 conductive and, because of inverter 66, renders gate 64 non-conductive. The output of amplifier 52 remains coupled to integrating capacitor 53 but the capacitor is returned to ground in this mode rather than to the input circuit of the amplifier. The ACQ signal also actuates gate 67 to apply a feedback signal, via resistor 81, and an input signal, from filter 32, through parallel connected resistor 68 and capacitor 69 to the inverting input terminal of amplifier. The amplifier circuit thus operates as a wideband inverting amplifier during the acquisition mode, and the input circuit includes resistors 54 and 68 and capacitor 69, all connected in parallel. The values of resistor 68 and capacitor 69 are chosen to provide the desired wide loop bandwidth during the acquisition mode. When phase lock occurs, gates 65 and 67 are cut-off while gate 64 conducts, thereby closing the loop about amplifier 52. The bandwidth in this mode is much narrower, as determined by capacitor 53 and the active ones of resistors 54, 55, 56, 58, 60, 62.

It is important to point out that during the acquisition mode capacitor 53, even though not in the phase lock loop, rapidly charges to the output voltage from amplifier 52. The capacitor is thus pre-charged during acquisition so that it is switched into the loop with precisely the right charge upon phase lock. The switching of the capacitor, therefore, does not introduce sudden transients or noise with might destroy the lock condition or otherwise interfere with smooth phase tracking. More importantly, the VCO is automatically preset to the proper condition.

The integrator output signal is utilized as a control voltage to control the frequency of VCO's 34 and 35. VCO 34 has a relatively wide frequency range and is capable of tracking the measurement signal about 107 KHz ± 2.2 KHz. VCO 35 has a narrower frequency range and tracks about 107 KHz ± 200 Hz. Wide range VCO 34 is in the loop when the 10 Hz control signal is present to actuate gate 36b at the output of the VCO. Narrow range VCO 35 is in the loop when the 10 Hz control signal is not present (i.e. — the loop is operating with either a 0.1 Hz or 1.0 Hz bandwidth) through the action of inverter 70 and VCO output gate 36a. The VCO signal selected by gates 36a and 36b is applied to the phase detector 30 and lock detector 31 in the manner described above.

The error signal from the phase lock loop, which is proportional to jitter, is applied to an absolute value amplifier 71 as illustrated in FIG. 1. The absolute value amplifier has a unipolar output level which is proportional to the magnitude of the bipolar error signal. Such an amplifier is employed so that a single positive threshold can be used to monitor phase hits of either polarity rather than using two thresholds of opposite polarity set to equal one another as closely as possible.

The output signal from absolute value amplifier 71 drives the hit detector circuit 72 which is a threshold circuit. The hit detector circuit provides a short pulse each time the amplitude of the signal from amplifier 71 exceeds an established threshold level.

Pulses from the hit detector 72 are passed through a timer switch 73 to a hit counter 74. Timer switch 73 is operator-set to a desired time interval during which it passes the detected phase hit pulses to the hit counter. After the set time has elapsed the timer switch opens and prevents further accumulation of hit counts. The counter 74 merely counts the hits and displays the count for the operator. The counter is resettable so that upon each starting of a timing interval at timer 73, the counter may be reset to zero.

The meter detector circuit 75 also receives the output signal from absolute value amplifier 71. Circuit 75 merely renders the amplified signal compatible to operate jitter meter 76 which provides an RMS indication of time jitter on the input signal to the system.

Amplifier 77 provides a buffered output signal having an amplitude proportional to the measured timing jitter. The input signal for amplifier 77 is derived from the 10 KHz filter 32 in the phase lock loop.

The circuits represented by blocks only are conventional in nature and are readily obtainable from a variety of sources. As an example, gates 57, 59, 61, 63, 64, 65, and 67 in FIG. 2 may be FET transistor gates. The unique combination of these circuits, however, have resulted in:

1. a time jitter meter employing only one phase lock loop yet capable of measuring time jitter on multiple pulse trains of different frequency;
2. a time jitter meter capable of selective measurement resolution; and
3. a tracking loop switchable from first order in the acquisition mode to second order in the tracking mode without introducing detrimental transients, the result being achieved by charging the integrator capacitor to the proper level outside the loop during acquisition and then switching it into the loop upon lock on.

While I have described and illustrated specific embodiments of my invention, it will be clear that variations of the details of construction, which are specifically illustrated and described may be resorted to without departing from the true spirit and scope of the invention as defined in the appended claims.

I claim:

1. A time jitter meter for measuring time jitter on a plurality of individually applied input pulse trains of different frequency, said time jitter meter comprising:
   a phase lock loop arranged to receive a measurement signal exhibiting time jitter to be measured, said loop comprising:
   a voltage controlled oscillator for providing a VCO signal at a nominal frequency;
   phase detector means for providing an error signal having an amplitude which is a function of the phase displacement between said measurement signal and said VCO signal; and
   integrator means for time-averaging said error signal and controlling the phase of said voltage controlled oscillator in accordance with the time-averaged value of the error signal amplitude;
   signal conditioner means for receiving said individually applied input pulse trains and converting each received pulse train to said measurement signal having said nominal frequency and bearing the same time jitter as the converted input pulse train; and
   measurement means responsive to said error signal for providing an indication of at least one parameter of said error signal.

2. The time jitter meter according to claim 1 wherein said signal conditioner means comprises:
   first translation means for converting the applied pulse train to an intermediate signal having a predetermined frequency and bearing the same time jitter as said applied pulse train;
   resolution control means for selectively dividing the frequency of said intermediate signal by one of plural operator-selectable factors; and
   second translation means for converting the frequency-divided intermediate signal to said measurement signal at said nominal frequency.

3. The time jitter meter according to claim 2 wherein said first translation means comprises:
   a plurality of local oscillators, one for each of said plurality of input pulse trains, the frequency of each local oscillator being such that the sum of or the difference between that local oscillator frequency and a respective input pulse train frequency equals said predetermined frequency of said intermediate signal;
   mixer means for mixing two signals applied thereto and providing signal components at the sum and difference frequencies of the two applied signals;
   means for applying the input pulse train to said mixer means as one of said two signals;
   means for selectively applying to said mixer means, as the second of said two signals, a signal from the local oscillator having a frequency which when added to or subtracted from said predetermined frequency is equal to the frequency of said input pulse train; and
   bandpass filter means tuned to said predetermined frequency for receiving the signal components provided by said mixing means and passing as said intermediate signal only that frequency component equal to said predetermined frequency.

4. The time jitter meter according to claim 3 wherein said phase lock loop further comprises:
   phase lock detector means responsive to said measurement signal and said VCO signal for providing a control signal indicating when the voltage controlled oscillator is not phase locked to the measurement signal;
   means responsive to said control signal for charging said integrator means outside of said phase lock loop when said VCO signal is not phase locked to the measurement signal, and for charging said integrator means within said phase lock loop when said VCO signal is in phase with said measurement signal.

5. The time jitter meter according to claim 3 wherein said integrator means includes a capacitor and an operational amplifier having an input terminal and an output terminal, said output terminal being connected to one side of said capacitor, and wherein said phase lock loop further comprises:
   phase lock detector means responsive to said measurement signal and said VCO signal for providing a control signal when the VCO signal is not phase locked to the measurement signal; and
   switch means responsive to said control signal for connecting the other side of said capacitor to ground when said VCO signal is not phase locked to said measurement signal and for connecting said other side of said capacitor to the input terminal of said operational amplifier when said VCO signal is phase locked to said measurement signal.

6. The time jitter meter according to claim 5 wherein said measurement means comprises:
   hit detector means responsive to each excursion of the amplitude of said error signal above a pre-established level for providing a hit pulse; and hit counter means for counting hit pulses from said hit detector means.

7. The time jitter meter according to claim 6 further comprising settable timer means for limiting counting of said hit pulses at said hit counter to selectable time intervals.

8. The time jitter meter according to claim 5, wherein said measurement means comprises:
    meter circuit means for providing an RMS meter indication of the amplitude of said error signal.

9. The time jitter meter according to claim 2, wherein said measurement means comprises:
    hit detector means responsive to each excursion of the amplitude of said error signal above a pre-established level for providing a hit pulse; and
    hit counter means for counting hit pulses from said hit detector means.

10. The time jitter meter according to claim 2 wherein said measurement means comprises:
    meter circuit means for providing an RMS meter indication of the amplitude of said error signal.

11. The time jitter meter according to claim 1 wherein said phase lock loop further comprises:
    phase lock detector means responsive to said measurement signal and said VCO signal for providing a control signal indicating when the voltage controlled oscillator is not phase locked to the measurement signal;
    means responsive to said control signal for charging said integrator means outside of said phase lock loop when said VCO signal is not phase locked to the measurement signal, and for charging said integrator means within said phase lock loop when said VCO signal is in phase with said measurement signal.

12. The time jitter meter according to claim 1 wherein said integrator means includes a capacitor and an operational amplifier having an input terminal and an output terminal, said output terminal being connected to one side of said capacitor, and wherein said phase lock loop further comprises:
    phase lock detector means responsive to said measurement signal and said VCO signal for providing a control signal when the VCO signal is not phase locked to the measurement signal; and
    switch means responsive to said control signal for connecting the other side of said capacitor to ground when said VCO signal is not phase locked to said measurement signal and for connecting said other side of said capacitor to the input terminal of said operational amplifier when said VCO signal is phase locked to said measurement signal.

13. A method for measuring time jitter on a plurality of individually applied input pulse trains of different frequency, said method comprising the steps of:
    processing a measurement signal exhibiting time jitter to be measured by the steps of:
        providing a VCO signal having a nominal frequency which is voltage responsive;
        providing an error signal having an amplitude which is a function of the phase displacement between said measurement signal and said VCO signal;
        time-averaging said error signal; and
        controlling the phase of said voltage controlled oscillator in accordance with the time-averaged value of the error signal amplitude;
    converting each of said individually applied input pulse trains to said measurement signal at said nominal frequency and bearing the same time jitter as the converted input pulse train; and
    measuring a predetermined parameter of said error signal.

14. The time jitter meter according to claim 13 wherein said step of converting includes the steps of:
    converting the applied pulse train to an intermediate signal having a predetermined frequency and bearing the same time jitter as said applied pulse train;
    selectively dividing the frequency of said intermediate signal by one of plural operator-selectable factors; and
    converting the frequency-divided intermediate signal to said measurement signal at said nominal frequency.

15. The time jitter meter according to claim 14 wherein said step of processing includes the steps of:
    providing a control signal indicating when the voltage controlled oscillator is not phase locked to the measurement signal;
    charging said integrator means outside of said phase lock loop when said VCO signal is not phase locked to the measurement signal; and
    charging said integrator means within said phase lock loop when said VCO signal is in phase with said measurement signal.

* * * * *